United States Patent [19]

Arn et al.

[11] Patent Number: 4,535,355

[45] Date of Patent: Aug. 13, 1985

[54] METHOD AND APPARATUS FOR SCRAMBLING AND UNSCRAMBLING DATA STREAMS USING ENCRYPTION AND DECRYPTION

[75] Inventors: Robert M. Arn; Peter H. Csanky; Glen F. Waszek, all of Toronto, Canada

[73] Assignee: Microdesign Limited, Toronto, Canada

[21] Appl. No.: 415,317

[22] Filed: Sep. 7, 1982

[30] Foreign Application Priority Data

Jun. 23, 1982 [CA] Canada ................................ 405818

[51] Int. Cl.³ .......................... H04N 7/16; H04N 1/04
[52] U.S. Cl. .................................. 358/123; 178/22.17; 179/1.5 FS; 358/122; 375/2.1; 375/2.2; 455/27
[58] Field of Search ....................... 358/117, 122, 123; 178/22.17; 455/27; 375/2.1, 2.2; 179/1.5 FS

[56] References Cited

U.S. PATENT DOCUMENTS

| | | | |
|---|---|---|---|
| 3,789,131 | 1/1974 | Harney ................................ | 358/122 |
| 3,885,089 | 5/1975 | Callais et al. ...................... | 358/122 |
| 4,013,837 | 3/1977 | Branscome et al. ................. | 455/27 |
| 4,079,419 | 3/1978 | Siegle et al. ........................ | 358/117 |
| 4,130,833 | 12/1978 | Chomet ............................... | 358/123 |
| 4,245,245 | 1/1981 | Matsumoto et al. ................. | 358/123 |
| 4,322,745 | 3/1982 | Saeki et al. ......................... | 358/123 |
| 4,354,201 | 10/1982 | Sechet et al. ....................... | 358/122 |
| 4,355,415 | 10/1982 | George et al. ...................... | 358/114 |
| 4,430,669 | 2/1984 | Cheung .............................. | 358/123 |
| 4,450,481 | 5/1984 | Dickinson .......................... | 358/114 |

Primary Examiner—S. C. Buczinski
Attorney, Agent, or Firm—Donald E. Hewson

[57] ABSTRACT

Methods and apparatus for scrambling and unscrambling a plurality of data streams having differing data, on a plurality of signal channels, are taught. The data streams may be television programs or other signal information, transmitted in a frame-by-frame manner with discrete synchronizing information, and where some of the data streams may be high priority such as pay-TV program material. All of the data streams are synchronized, an encryption key code is imposed on them, and a data package containing an identifier code for each data stream and a routing code is generated, so that each data stream is assigned at any instant of time to a specific one of the plurality of signal channels. The data package is encrypted in each data stream by being inserted at a specific place therein relative to the synchronizing information. At any authorized receiver the encryption key code is captured and used to decrypt the encrypted data package so as to decode the identifier and routing codes thereof, whereby a given data stream may be tracked no matter on which transmitted channel it appears at any instant of time. Several embodiments for controlling a local oscillator so as to track a given data stream, are taught.

28 Claims, 4 Drawing Figures

METHOD AND APPARATUS FOR SCRAMBLING AND UNSCRAMBLING DATA STREAMS USING ENCRYPTION AND DECRYPTION

FIELD OF THE INVENTION

This invention relates to methods and apparatus for scrambling and unscrambling pluralities of data streams such as differing television programs and the like, where the scrambling and unscrambling occurs by way of routing information which is coded in a data package and encrypted in each of the data streams. In particular, the present invention teaches methods and apparatus for scrambling and unscrambling a plurality of data streams in a direct broadcast satellite (DBS) system and/or a cable system, where the unscrambling and tracking of specific data streams or programs occurs at a decryption and unscrambling apparatus which is installed at each system subscriber's home or other program reception location, each of which has a unique address which is accessible by way of access data embedded within the data streams.

BACKGROUND OF THE INVENTION

As there becomes more interest and activity in direct broadcast satellite transmission systems, by which signals may be received at a receiving dish at each subscriber's home, and especially where some of those signals may be high-priority signals such as for pay TV television channels and the like, the problem of scrambling those signals so as to avoid access to them except to subscribers who have the right to such access, becomes more severe. In some respects, cable operating systems also have the same problems, in that many data streams or television programs or the like may be transmitted throughout a cable system, where perhaps only some of the subscribers have the right of access to certain of the program material.

The same problems, and thus the same general solutions, may also be related to other forms of data stream transmission and reception, such as conferencing data (video and/or audio) from remote locations, and the transmission of data having commercial or military security requirements from remote locations and/or over long distances.

DBS operating systems are generally intended for operation at a nominal frequency of 12 gHz, where a plurality of differing source material is transmitted from a common transmitter to a satellite and thence is beamed downwardly to a reception area which may, indeed, cover many thousands of square kilometers. Other transmission systems operate off stationary satellites at lower frequencies, generally 4 gHz, and still other multi-channel broadcasting systems are cable-related, where there may be no free air transmission. In any event, whenever the data is transmitted in a frame-by-frame manner, such as television signals or other secure data, there is a requirement that synchronizing information be transmitted with the various data streams so that the receiving tuners and demodulators may lock onto the signal without video roll-over, or the like. However, when there is a desire to isolate one or more of a plurality of data streams, such as pay tv program material, high security data, or the like, from reception other than by authorized receivers or subscribers, it is the usual approach to "scramble" those signals such as by moving the signals or data streams from channel to channel on a regular or irregular basis, thereby requiring that the tuner at the recieving end of the broadcast also moves from channel to channel in order to continue to track the program material or data stream. This, however, may create difficulties in that synchronization may be lost each time the channel upon which the data stream is being transmitted switches to another channel, so that one or more frames of data may be lost at the receiver before re-synchronization is achieved. This may occur because of the inability of the local oscillator in the tuner to be able to shift frequencies sufficiently fast so as to be able to lock onto the next designated channel frequency within the interval between frames, so that one or several frames of data may be lost.

Moreover, where there may be several data streams of differing information that are to be scrambled, it may also happen that each of those data streams may have differing priority levels. For example, in a system that provides access to certain television programs to subscribers who pay the necessary fees, there may be a first priority by which subscribers would have access to television transmissions of first-run movies, a second priority where subscribers would have access to live sporting events such as boxing matches or international team events or the like, and a third priority permitting access to "adult" movies or the like. All of those priorities may be mutually exclusive to one another, or they may be graded so that access to priority three permits access to priorities one and two as well, but access to priority one precludes access to the other two priorities, and so on.

In any event, it may be that in a DBS system, or a cable system, all or at least some of the data streams or program channels may be scrambled, whereby access to the scrambled channels can be achieved only by having access to the unscrambling data so as to achieve any meaningful reception. Access to certain priority channels may be otherwise denied except upon possession by the subscriber of the necessary additional access keys. Of course, all such access codes and keys, etc., are or may be embedded electronically as digital or analog data within the data stream.

There thus becomes the requirement that the tuner and data stream access hardware installed at each subscriber's home, or otherwise, must have the ability to detect the necessary routing by which the scrambling has occurred, so as to unscramble the transmitted channels and therefore so as to be able to track a given program or data stream. Of course, such hardware must be such as to be able to switch from one assigned channel frequency to another, according to the routing code, as quickly as possible to avoid loss of synchronization or lock-out, and in the worst case condition within the time required for transmission and reception of one frame of data.

This also means that competing DBS and/or cable systems may operate, each having their own scrambling and descrambling protocols, where a subscriber to one system would be unable to receive and unscramble program material from the other system. It becomes even more apparent when it is recognized that data packages carrying all of the routing and identifier codes may by encrypted in the data streams.

What is meant by "encryption" is that a program material or data package is "buried" at some place within the data stream signal, by codification of the data but not codification of the signal stream itself. That is, encryption of routing data within a package can occur by first generating an encryption key code, by which even if the data is read it may not be decrypted without access to the encryption key so as to make the routing code meaningful. Examples of encryption, and routing, will be discussed hereafter.

Several prior patents have been noted, which teach varying approaches to scrambling and descrambling of data, and in all of those instances the data is specifically related to television broadcast program material. For example, KIRK, Jr. et al, U.S. Pat. No. 3,733,431, issued May 15, 1973, teaches an apparatus which is particulary for use in CATV systems, whereby only subscribers who have paid an extra premium may obtain access to certain of the television programs being transmitted. The patent speaks of "encripted" signal distribution, but the technique described is one of simple scrambling between predetermined transmission channels at a relatively low but preferrably non periodic rate.

HARNEY, U.S. Pat. No. 3,789,131, issued Jan. 29, 1974, teaches a coding system for subscription television, where once again a television signal is switched between channels and where an enabling signal is transmitted to each subscriber so that, after the cannels have been switched, each of the selected subscribers who have paid the necessary premium may have access to the new chanel. HARNEY specifically requires that the channel switching commands be sent during the vertical blanking interval of the television program material to be switched, where first there is an initial authorization cycle which preceeds the start of a coded program. Because all subscribers who have paid the premium are first enabled by the initial authorization cycle, the actual channel switching command does not contain an address of any subscriber, and need not be repetitive, so that it may be sent during the vertical blanking interval between frames of the television program which is being coded for authorized reception only.

FORBES, U.S. Pat. No. 3,914,534, issued Oct. 21, 1975, teaches yet another method and apparatus for scrambling and unscrambling premium television channels, whereby a scrambling code is generated and sent to selected subscribers whereby they may unscramble the premium program. The scrambling occurs by switching from one to another video channel during the vertical interval, and is made more secure by transmitting a second program signal in field synchronization with the premium program signal, and so that after switching, more efficient use is made of the existing communication channels.

It is an advantage of the present invention that, especially in a DBS operating system, transponder operating frequencies may be assigned to the convenience of the overall system, rather than having to conform to existing transponder allocation frequencies. Indeed, the same may be said for cable operating systems. Thus, additional channels or subcarriers may be included in the same frequency spectrum, because the present invention provides means for accurately tracking any given data stream as it moves among various assigned channel or transponder frequencies.

We have discovered that by synchronizing a plurality of data streams, each of which has discrete and recognizable synchronizing information, and where there are at least as many signal channels as there are data streams, the data streams may be scrambled and unscrambled in a very secure manner by imposing an encryption key code onto each of the data streams and encrypting a data package which contains an identifier code for each data stream and a routing code by which the plurality of data streams is to be routed, in each data stream, so that the plurality of data streams may be scrambled by assigning each of them to a specific channel at any given instant of time. Moreover. the scrambled channels may be received and, by capturing the encryption key code and utilizing it to decrypt the encrypted data package so as to decode the identifier and routing codes, they may be descrambled in order that any given data stream may be tracked, no matter on which transmitted channel it may appear at any instant of time.

Each of the data streams may have a plurality of identifiable data stream categories which may or may not be mutually exclusive in any combination. Access may be permissible to any designated data stream category or combination of categories, according to the present invention, by the provision of an access data key; where the encrypted data package in a data stream may include, periodically or aperiodically, coded data stream category access data which is relevant to the category of the respective data stream being transmitted at that time. Of course, the present invention particulary envisages that at least one or more, if not all, of the data streams will have a video signal and other data present. That other data may comprise mono or stereo audio signals, conferencing data or other proprietary data by which at least two remote locations are joined together for a multi-path exchange of data, to which limited access is desirable.

It is a particular feature of the present invention that, for the fastest and most efficient operation, each authorized reciever is equipped with a microprocessor which has memory, and where a common encryption algorithm is written into the memory of each of the microprocessors at each authorized receiver. Moreover, each authorized receiver would, in the most common mode by which the present invention may be practiced, have a unique address.

The present invention provides two general approaches to the problem of controlling a local oscillator (voltage controlled oscillator) so as to effectively track a given data stream as it is switched among the assigned signal channel frequencies. Control of the voltage controlled oscillator may be by way of a phase lock loop frequency synthesizer acting together with a digital to analog converter, whereby switching of the local oscillator frequency may be very fast because substantially the correct voltage is imposed upon it. Alternatively, the output of the voltage controlled oscillator may be directly controlled by a digital to analog converter whose output is continuously updated by reference to the amount of drift that there may be by the oscillator from the actual frequency which is intended, where the drift may occur as a consequence of changing temperature or other environmental conditions and occurs relativey slowly.

It is a purpose of the present invention to provide methods of scrambling and unscrambling a plurality of data streams using encryption and decryption of data packages within the data streams, whereby any given one of the data streams may be tracked no matter on what signal channel it may appear at any instant of time.

A further object of the present invention is to provide limited acbess by authorized subscribers only to certain permium data channels having specific data categories.

Yet a further object of the present invention is to provide methods of controlling a voltage controlled local oscillator so that tracking of a given data stream may be effected without loss of data, assuming that the data is transmitted in a frame-by-frame manner and that tracking of the data stream from one assigned signal channel to another occurs by following the data stream as it is switched during the interval between successive frames of data.

Moreover, the present invention provides apparatus for scrambling and descrambling data streams, with several alternative embodiments of apparatus for controlling the output of a local oscillator so as to effect data stream tracking as it is switched among the assigned signal channels.

BRIEF DESCRIPTION OF THE DRAWINGS

These and other objects and features of the invention are discussed in greater detail hereafter in association with the accompanying drawings, in which.

DESCRIPTION OF THE PREFERRED EMBODIMENTS

As mentioned above, when the present application discusses encryption and decryption of data packages, it is meant that the data package is inserted into a data stream in a specific place according to a protocol which has been established, and not that the data stream has been coded itself. Certain other distinctions, as to varying designations, and definitions of terms used, will be given hereafter.

What the present invention provides is both apparatus and methods for both scrambling and unscrambling a plurality of data streams, and several different embodiments of apparatus and methods for controlling a local oscillator so as to effect tracking of a given data stream. In the following discussion, the data streams may be referred to as being differing program materials, and while the discussion is generally directed to the transmission and reception of video program materials, it is clear that the present invention is not specifically restricted to video program data streams, but may extend to many other kinds of data which may be broadcast or transmitted according to a variety of different signal handling techniques. Moreover, it will be understood that transmission of the various data streams on assigned signal channels, in keeping with the present invention, may be by way of direct broadcast satellite or other signal satellites at which a plurality of receivers may be aimed, or it may be by way of terresterial transmission in the usual manner of VHF and/or UHF television signal transmission, or by distribution techniques such as by co-axial cable, fibre optics, microwave distribution or transmission, or any combination of the above.

Figure 1:
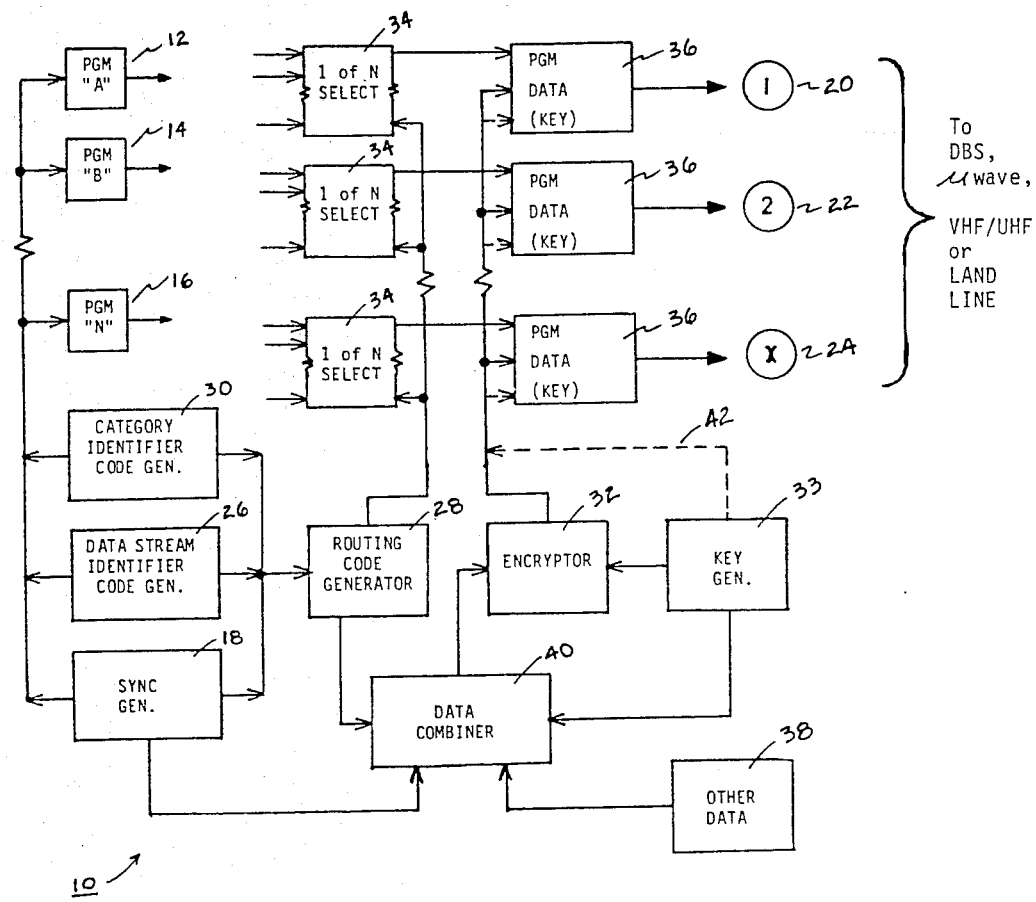
FIG. 1 is a block circuit diagram showing the principal components at the "head" or transmission end of a data stream scrambling and unscrambling system according to the present invention.

Referring now to FIG. 1, the "head" end or transmission end of a system by which a plurality of data streams may be scrambled according to the present invention is shown, and is designated generally at 10. A plurality of program materials, designated "A", "B", and "N", are shown at 12, 14 and 16 respectively. Each data stream or program material is, of course, understood to have differing data than the other data streams, and each data stream has discrete and recognizable synchronizing information contained therein, which synchronizing information may be periodically or aperiodically transmitted. That is, the synchronizing information may be transmitted at each frame of data, or it may be transmitted only after the transmission of several frames of data. In any event, it is assumed that the synchronizing information is imposed on the plurality of data streams from a synchronizing signal generator 18. A plurality of signal channels is identified by their channel numbers, in this case, and are thereby identified as signal channels "1", "2", and "X", at 20, 22 and 24, respectively. Of course, it is understood that there are at least as many signal channels as there are data streams, and there may be more signal channels than data streams.

Moreover, it is understood that each of the signal channels 20, 22 and 24 has a fixed carrier frequency, the specific frequencies being not relevant to the present discussion. However, it may be assumed that the specific frequencies of the differing signal channels may be in the 12 gHz range, or the 4 gHz range, or at much lower frequencies if terrestrial or cable transmission techniques, for example, are being used.

At the same time that the data streams 12, 14, etc. are being synchronized one to another, there is also imposed upon them a data stream identifier code, one for each data stream. The data stream identifier codes are generated in the data stream identifier code generator 26, whose output also goes to a routing generator 28. Various category identifier codes may also be generated from the category identifier code generator 30, particularly as discussed hereafter.

All of the data streams are fed to a plurality of data stream gates 34, each of which is controlled by the output of the routing generator 28, so that each of the gates 34 may select any one of the programs "A", "B", or "N", under the control of the routing generator, with the output of each of the gates being sent to one of a plurality of program and data package mixers 36. It will be noted that the outputs of the mixers 36 go to the differing signal channels, which may then be modulated and transmitted according to the techniques necessary for the transmission and/or distribution protocol being followed.

In any event, it is now seen that in each of the mixers 36 there is one of the programs "A" to "N", and at least an encryption key code from the encryption key code generator 33. Data packages are inserted into the data streams at the mixers 36, including the identifier code for each data stream (from generator 26), and a routing code (from the routing code generator 28) by which all of the data streams may be routed at any instant of time. Thus, each of the data streams is assigned to a specific one of the signal channels; and it is clear that the data stream assigned to signal channel "1" may be any one of the data streams "A" to "N", and so on for the other signal channels.

The data package which contains the identifier code and the routing code is encrypted in each of the data streams by inserting it in each respective data stream at a specific place therein relative to the synchronizing information therefor, under the control of encryptor 32.

There may also be included in the data packages any other data which is intended for encryption in the data streams, coming from a general source of other data indicated at 38.

All of the data for the data package is sent to the data combiner 40, so that encryption of the data packages within the data streams may occur under the control of the encryptor 32. It may also be noted that the encryption key which is the output of the encryption key code generator 33 may also be encrypted under the control of the encryptor 32, or it may be imposed at a different location within the data stream—as discussed hereafter—by combining it with the program and other data in the mixers 36, and as shown by the dashed line 42 in FIG. 1.

The data streams with their encrypted data packages are then transmitted over the signal channels, in accordance with the routing code at any instant of time.

Before proceeding to a discussion of the reception, decryption of the identifier and routing codes, and subsequent unscrambling of the data streams so that any given data stream may be tracked no matter on which signal channel it appears at any instant of time, the following discussion is made so as to clearly distinguish the differing codes and their purposes. First0 having regard to FIG. 4, a typical data stream 44 is shown, where the data stream comprises a plurality of differing kinds of data, and is transmitted seriatim in the direction indicated by arrow 46. The data stream 44 has, as its first signal packet, header and sync data 48. This may be followed by the data stream identifier codes and the routing codes, in a data package 50. Billing information, by which a specific subscriber may be identified according to his address, and his reception equipment enabled or disabled, may be transmitted in a packet 52.

An encryption key may be transmitted as a packet 54, and that encryption key may be the present encryption key or it may be the next encryption key. That is, the encryption key in the packet 54 may have information as to the present encryption of the encrypted data package including the identifier and routing codes, or it may have information as to the next encryption to be followed when the key is changed. Indeed, the encryption key may or may not be encrypted itself within a data package in the data stream.

Figure 4:
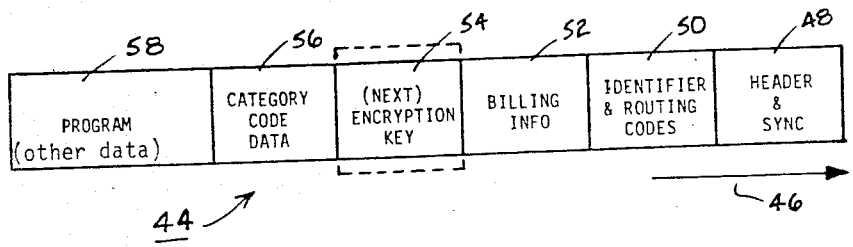
FIG. 4 is a diagrammatic representation of a typical data stream containing various signals whereby the scrambling and unscrambling of data streams according to the present invention may be effected.

Category code data, by which the category of the data stream is determined, may be included in a packet 56; and finally, the program data itself is transmitted in a packet 58. Of course, there is no intention of indication of scale or actual placement within a data stream of any of the data packets as shown in FIG. 4, and that figure is intended for ease of understanding of the following discussion.

Let it be assumed that the encryption key code may ormay not be necessarily transmitted within the data stream on a continuous basis, but that it will be transmitted at least periodically or aperiodically. Let it further be assumed that an identifier code for the data stream and a routing code by which the data stream is routed among the available signal channels, will always be transmitted in the data stream, and that they will be encrypted in a data package somewhere within the data stream.

Assume that there will be three programs which will be known by their names "J", "K", and "L"; and that the identifier codes for those programs are as shown in Table I:

TABLE I

| Program | J | K | L |
|---|---|---|---|
| Identifier Code | 001 | 011 | 111 |

Assume further that the routing code by which the programs are to be routed at a particular instant of time is

J L K

Given the above, the identifier codes are placed in the sequence according to the routing code in a data package having 9 bit positions as shown in Table II:

TABLE II

| Bit Number | 0 | 1 | 2 | 3 | 4 | 5 | 6 | 7 | 8 |
|---|---|---|---|---|---|---|---|---|---|
| Code Placement | 0 | 0 | 1 | 1 | 1 | 1 | 0 | 1 | 1 |

Assuming now that the encryption key, by which the respective bit positions will be encrypted in a specific order according to the key, is as follows:

| ENCRYPTION KEY |
|---|
| 867450123 |

This gives rise, therefore, to an encrypted data package by which the routing and identifiers for the programs "J", "K", "L", and the routing of them in the order "J L K" is as follows:

| ENCRYPTED DATA PACKAGE | | | | | | | | |
|---|---|---|---|---|---|---|---|---|
| | 1 | 0 | 1 | 1 | 1 | 0 | 0 | 1 | 1 |
| (Bit Position) | 8 | 6 | 7 | 4 | 5 | 0 | 1 | 2 | 3 |

From the above, it will be seen that after the encrypted data package is decrypted, and the bits are again read in the sequence as designated in Table II, the identifier codes will also have the same code placement as shown in Table II, so that at that instant of time and until the next routing code is generated, program "J" will be transmitted on the first designated signal channel, program "L" will be transmitted on the second designated signal channel, and program "K" will be transmitted on the third designated signal channel.

Clearly, the category code data in the package 56 may be encrypted with the other data, and it is evident that the encryption key itself may or may not be encrypted but that the data package is encrypted by inserting it into the data stream at a specific place therein relative to the synchronizing information. This is important because the subscriber's receiver apparatus will "look for" the data package at a specific place relative to the synchronizing information, so that it may recognize it and thereafter act upon it in keeping with the instructions received in the data package after it has been decrypted.

Thus, at any authorized receiver, the encryption key code is captured and utilized so as to decrypt the encrypted data package and thereby decode the identifier and routing codes. Utilizing the identifier and routing codes, a given data stream may therefore be tracked, no matter on which transmitted channel it appears at any instant of time. In the above example, if the subscriber is tracking program "K", at the particular instant of time that is being spoken of, his receiver will have adjusted the tuner so as to receive program "K" on signal channel "3".

As mentioned above, each of the data streams may have a plurality of identifiable data stream categories which are assigned by the category identifier code generator 30, and access to any designated data stream category or combination of categories may be by way of an access key which may also come from the key generator 33. If so, then the encrypted data package may include, either periodically or aperiodically, coded data stream category access data which is relevant to the category of the respective data stream being transmitted at that time.

Thus, as discussed in greater detail hereafter, where one of the data streams may be a video signal for which a category has been assigned, and the data package for that data stream includes a data category code, any receiver may be authorized to receive the category-identified data stream by having a preset access data key which recognizes and decodes the data stream category code for that category-identified data stream. Moreover, it is evident that the category of the data stream being transmitted may, from time to time, be altered.

As to the encrypted data packages, it has been stated that they may be transmitted together with the synchronizing information for all of the synchronized data streams. When the data stream has a video signal, then the encrypted data package may be transmitted on at least one vertical interval line of a single frame of that video signal. Moreover, the encrypted data package may be inserted within some of the horizontal synchronization intervals of a frame of the video signal. Still another protocol may be that the encrypted data package is carried on a sub-carrier which is transmitted together with the data stream, especially when it includes a video signal.

Figure 2:
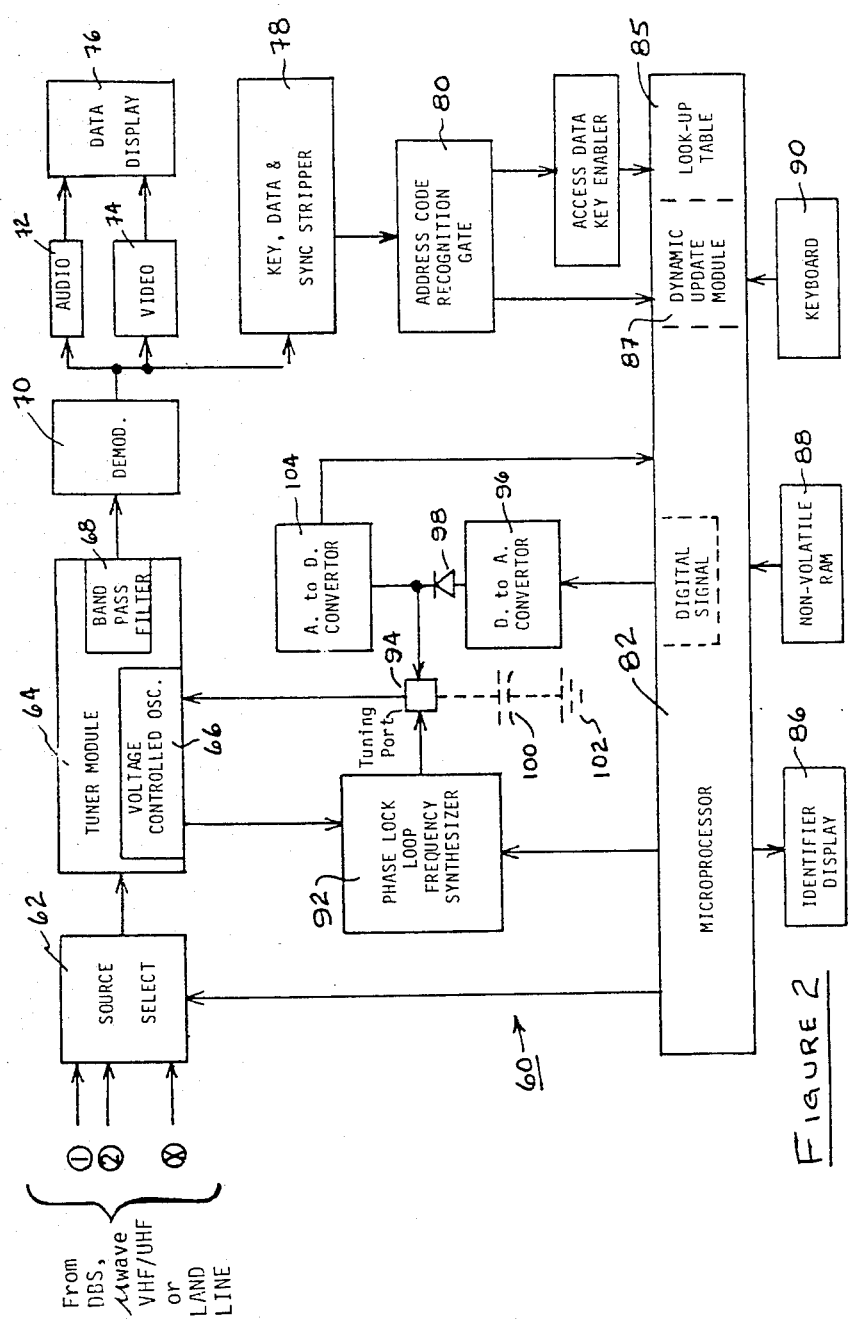
FIG. 2 is a block circuit diagram of a first embodiment of the subscriber's receiver end of a data stream scrambling and unscrambling system according to the present invention.

Referring to FIG. 2, a general embodiment of the receiver apparatus at each subscriber location is shown, and is designated generally at 60. Here, each of the signal channels 1 to X is received first at a source select module 62, from which a signal (which may be in the range of 60 to 800 mHz, or 3 to 12 gHz) is sent to the input of a tundr module 64. Within the tuner module 64, there is a voltage controlled oscillator (local oscillator) 66, the control of which is discussed hereafter. From a band pass filter 68, generally also within the tuner module 64, a signal which is generally in the 70 mHz range is passed to a demodulator 70. From the demodulator, the respective audio and video signals are sent to the appropriate intermediate frequency stages 72 and 74, so that finally the usable signal appears at data display 76; for example, following re-modulation, a television monitor.

A stripper 78 is provided, which generally acts to strip the key code, other data and synchronization data from the output of the demodulator 70, and that data in turn is sent to an address code recognition gate 80. At this time, if there is address data in the data stream which is not recognized by the recognition gate, no further signal handling will occur. Assuming, however, that either there is no address data code (the program has no or low priority) or that the address code has been recognized, data may then be sent to a microprocessor 82 or first to an access data key enabler 84 and thence to the microprocessor 82. In any event, means are provided within the microprocessor to decrypt the encrypted data package, and thence to capture the identifier code and the routing code for the various program materials and the channels upon which they are being transmitted at any instant of time. It is assumed that a common encryption algorithm may be written into memory in the microprocessor 82, so that all subscribers to the same system have a common encryption algorithm in the microprocessor memory of their respective receiver apparatus.

Depending on the specific embodiment of receiver apparatus, the identifier and routing codes may be handled somewhat differently, but nonetheless the voltage controlled oscillator 66 within the tuner 64 is controlled so that at any instant of time the selected data stream may be tracked as it moves from one signal channel to another under the control of the routing code.

Included in the receiver apparatus 60 there may be an identifier display 86, a non-volatile RAM (random access memory) 88, and a keyboard 90. The identifier display may be utilized to indicate to the subscriber the identity of the data stream being tracked; and the keyboard may be used by the subscriber for purposes of instruction as to the data stream to which he desires access, or for other purposes such as setting of timers or for writing into a buffer certain subscriber or timing information, depending upon the complexity of the overall apparatus. In any event, the address of the specific receiver may be written into the non-volatile RAM 88, and the data package which is transmitted periodically or aperiodically in the data streams may include an address code which is indicative of the address written into the RAM 88. In those instances, the address code recognition gate 80 becomes effective, so that the data packages may be stored by the microprocessor 82 and acted upon them, or not, depending on the status of that address. For example, if the subscriber has neglected to pay the necessary fees, access by him to any or all categories of program material available on the data streams may be determined by sending a specific code to that address and, upon recognition of it by the gate 80, setting the microprocessor to accept or reject additional data. This may be particularly accomplished by the access data key enabler 84, which may be set to accept certain categories of data stream and reject others, as discussed above.

Thus, access to a selected data stream may be determined by the presence or absence in the data package for that selected data stream of an access data key code which is indicative of permitted access to that data stream. Only upon the correct setting of the access data key enabler 84 would access be permitted to the selected data stream, so that it may be tracked in the manner discussed above. Obviously, the access data key code may set the access data key enabler 84 to enable or disable the tracking of a selected data stream, from time to time.

Accordingly, where any of the data streams includes a data stream category identifier code, the access data key enabler 84 may enable or disable the microprocessor 82 to control the tuner 64 with respect to any selected data stream having a specific category identifier code as determined by the access data key code.

Also, as noted, the presently transmitted encryption key code is used so as to permit decryption of the data streams being transmitted at that instant of time. Moreover, the presently transmitted encryption key code may be stored, and means provided for recognizing when the encryption key code is changed (for example, together with the access data key enabler 84), so that when a change of encryption key code occurs, decryption of the data streams thereafter transmitted is in accordance with the previously transmitted encryption key code, and the new encryption key code is stored until the next change of code.

Because the data encryption occurs at the head end of the system, but data decryption occurs at each subscriber's receiver, a cable or re-broadcast operator who is handling the scrambled data streams may have the opportunity to insert his own program data into the transmitted signal. Moreover, the cable or re-broadcast operator has the opportunity to insert his subscriber data into the data streams, so as to preclude tuning to his scrambled signal by a non-paying or unauthorized subscriber.

There may also, of course, be a "free" channel or channels among the data streams being transmitted and received, which channel or channels would pass directly through the tuner module and the remaining circuits so that, as far as that channel may be concerned, the receiver acts as an ordinary receiver in any event.

As to the matter of the encryption key, it has been stated that the encryption key may change periodically or aperiodically. Indeed, the encryption key may change every frame, or it may change every time that the data package is changed. It has also been noted that all of the microprocessors in any given system would have a common encryption algorithm which may be programmed into its memory. Such programming would normally be done by the conventional masking and burning techniques during manufacture of the microprocessor, so that the design of the encryption algorithm would be unique to those microprocessors having the same mask.

Of course, encryption itself may be very simple, such as by the transmission of a signal which may be received and interpreted as merely an instruction to invert or not to invert the incoming data package data in order to decode the same. Moreover, the encryption key itself may be hidden in the data package by embedding it at a given bit position or bit positions, which themselves could then be changed from time to time. Moreover, the category and program content for each data stream may be coded by way of an identifier code in the data package, which may even be the name of the program or an indication of the program material being transmitted.

To assure tracking of a given data stream at the subscribers tuning and descrambling apparatus, it is necessary that absolute synchronization of the data streams at the transmitting end be effected, and to assure frequency predictability of the operation of the voltage controlled oscillator as it switches from one designated signal channel to another under the control of the routing codes. That is, because tuning from one signal channel to another is determined by the frequency of the voltage controlled oscillator, it is necessary that the switching operation of the voltage controlled oscillator from one frequency to another be predictable as to the new frequency, the speed at which the oscillator will settle at the new frequency, and the likelihood of undershoot or overshoot with respect to the frequency. Two somewhat different approaches to control of the local oscillator 66 are described hereafter in association with FIGS. 2 and 3. In general, frequency synthesis may be under the control of a phase lock loop frequency synthesizer, or a digital to analog convertor, or both. Each approach has certain advantages, and some disadvantages, as discussed hereafter.

It must also be noted that the rate of handling the encrypted signal may be a function of where the signal is encrypted within the data streams. For example, as mentioned, the data package may be transmitted in the vertical interval, in which case it is necessary that there be a hardware buffer having high frequency input and low frequency output of signals. This comes because the effective line rate of a video signal is approximately 15 kHz, but the signal rate on the line is as high as 5 mHz. Because of the operating limits of the microprocessor, the data speed to it must be at a lower rate than a signal rate of about 5 mHz. Also, when the data package is included with the sync pulse, and assuming the data package to be 256 bits long, then it will be necessary for 256 bits of information to be transmitted in one thirtieth of a second, which again may be too fast for the microprocessor to handle. This may, however, be overcome by providing that the data and sync stripper 78 has the ability to operate at approximately 5 mHz and to output data at a speed of less than 10 kHz to the microprocessor, and may come by the provision of a dual clock FIFO (first-in-first-out) module, or by the provision of a serial to parallel convertor. In any event, it is obvious that the data stripper must be capable of holding the data until the microprocessor accesses it according to its own data access protocol.

As previously stated, the tuner module 64 may have in it a voltage controlled oscillator 66. The operation of the voltage controlled oscillator 66 determines the ability of the tuner to track a data stream as it is switched among the signal channels, whereby the output from the tuner module is under the control of the local oscillator so that the demodulator 70 may produce the appropriate audio and video signals.

Of course, the voltage controlled oscillator 66 may be replaced by a plurality of tuned and switchable local oscillators, or at least coils for a local oscillator, but the expense of providing such circuit components is excessive, and in any event would require fast and accurate mechanical switching.

One of the approaches to controlling the local oscillator or voltage controlled oscillator 66, whose frequency output is in any event a function of an imposed input voltage, is shown in FIG. 2. There, as discussed, the output frequency of the voltage controlled oscillator 66 may be changed from any one of a plurality of assigned data stream channel frequencies to any other one of the assigned data stream channel frequencies, plus or minus a constant intermediate frequency offset, from time to time, and either periodically or aperiodically. In the circuit of FIG. 2, an output from the microprocessor 82 is fed to a phase lock loop frequency synthesizer 92. The signal imposed on the phase lock loop frequency synthesizer (hereafter referred to as a PLL) is produced by the microprocessor, and is indicative of the assigned frequency at the particular instant of time, that data having been determined by decryption and decoding of the routing code within the encrypted data package. Also imposed on the PLL is a signal from the voltage controlled oscillator 66. At any instant of time when the signals indicate a difference between the present local oscillator frequency and the assigned frequency, the PLL generates a voltage signal which is imposed on a tuning port 94. In general, the operation of the PLL is such that it is a pulsed constant current source or sink.

Also imposed on the tuning port is a signal from a digital to analog convertor 96, which is passed to the tuning port through an isolating or blocking diode 98. The signal which is imposed on the digital to analog convertor is a digital signal from the microprocessor which is indicative of the voltage required to be imposed on the voltage controlled or local oscillaor 66 so that its output frequency will be the assigned frequency at that instant of time. The digital to analog converter then generates an analog signal which is imposed on the tuning port 94 through the isolating diode 98, where the analog signal is substantially equal to the required voltage by which the voltage controlled oscillator will have the requisite output frequency. There is thus imposed on the tuning port 94 a voltage from the PLL and a voltage from the digital to analog convertor, whereby the frequency of the voltage controlled oscillator is determined after the voltage is imposed on the tuning port from the digital to analog convertor during the period that the routing code in respect of the new assigned channel is stripped from the data package, the digital to analog convertor 96 is turned off. At any time that the frequency of the voltage controlled oscillator 66 must shift, the PLL 92 may not be able to settle fast enough on an output representative of the new frequency. However, the tuning voltage of the oscillator 66 may be "forced" to its new value—or at least substantially to its new value—by the voltage imposed on it from the tuning port 94 due to the operation of the digital to analog convertor 96.

In an alternative embodiment of the general embodiment of FIG. 2, there may also be provided a capacitor 100 which is inserted between the tuning port 94 and a ground potential 102. As mentioned above, after the voltage is imposed on the tuning port from the digital to analog convertor during the period that the routing code in respect of the new assigned channel is stripped from the data package, the digital to analog convertor 96 is turned off. This allows the PLL to attempt to lock onto the designated channel voltage under control of the microprocessor 82. However, since the voltage of the tuning port 94 is substantially at the correct voltage due to the imposition thereof of the analog signal from the digital to analog convertor 96, the voltage is maintained by the capacitor 100, and the PLL has very little additional work to do to achieve the required output. Thus, lock of the voltage controlled oscillator 66 to the new frequency is achieved very quickly, without significant overshoot or hunting; and the local oscillator frequency for the designated channel, at that point of time, is tuned, and thus the specific data stream being tracked has been followed to its new assigned signal channel.

Indeed, by the provision of an analog to digital convertor 104, which senses the voltage at the tuning port 94, the operation of the circuit of FIG. 2 can be made to be essentially self-calibrating. In this manner, the operation may be very accurate and very fast, and is accomplished by allowing the microprocessor to read the tuning voltage after the PLL has settled. The digital value of the tuning port voltage after the PLL has settled is stored in a look-up table 85 of the random access memory of the microprocessor, which may then be updated by a dynamic update module 87 within the memory. Thus, the next time that access of that specific signal channel is required, the look-up table 85 has the necessary information, which may be updated again due to possible changes of conditions such as temperature.

As a practical matter, such conditions do not change rapidly, so that there may be only minor changes required by the dynamic update module 87 to the look-up table 85. Therefore, and in any event, any drifting of the voltage controlled oscillator 66 is automatically compensated for.

Figure 3:
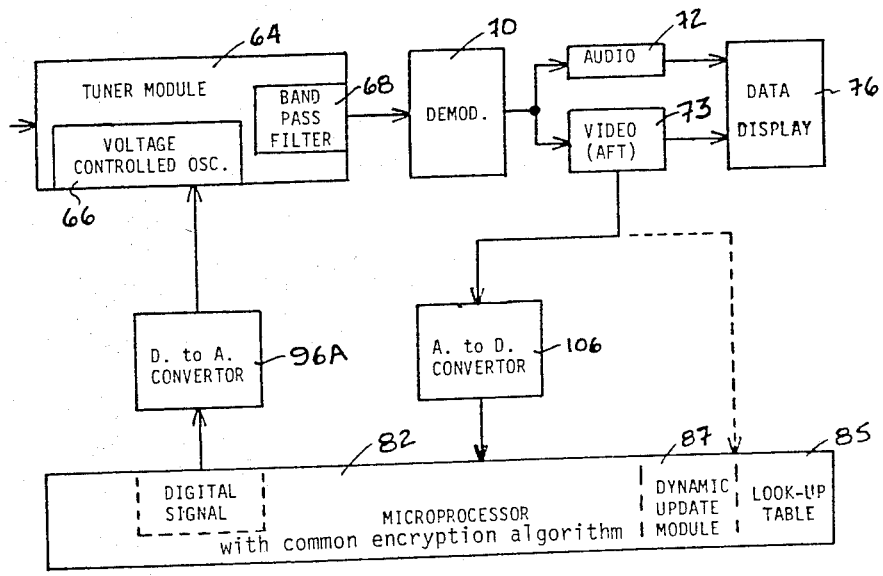
FIG. 3 is a block circuit diagram of a portion of the circuit of FIG. 2 showing the use of alternative components.

Referring now to FIG. 3, a different embodiment is shown for controlling the output of the voltage controlled oscillator 66 of the tuner 64. In FIG. 3, like components to those illustrated in FIG. 2 carry identical reference numbers; except that the analog to digital convertor 106 illustrated in FIG. 3 has a different purpose and is thereby identified differently than the analog to digital convertor 104 of FIG. 2, and the digital to analog convertor 96A of FIG. 3 is similar to but not necessarily identical to that which is shown in the circuit of FIG. 2, and that the video intermediate frequency stages include an automatic fine tuning (AFT) module 73.

In any event, it will be noted that there is imposed on the digital to analog convertor 96A a digital signal which is indicative of the voltage required to be imposed on the local oscillator or voltage controlled oscillator 66. The digital to analog convertor 96A generates an analog signal which is imposed on the voltage controlled oscillator 66, and thus the output frequency of the voltage controlled oscillator is substantially that which is required in order that the output frequency of the oscillator shall be the assigned frequency at that instance of time, and thereby so that the desired data stream continues to be tracked.

There is imposed on the microprocessor 82, which has both a look-up table 85 and a dynamic update module 87, a signal from the automatic fine tuning module 74 which is indicative of the offset from the intended frequency of the actual frequency of the voltage controlled oscillator 66 being produced at any instant of time. The signal from the AFT module 73 is compared in the look-up table 85 with the actual signal being generated by the microprocessor 82 and being imposed on the digital to analog convertor 96A, and, when necessary, the value of the digital signal being imposed on the digital to analog convertor 96A is adjusted accordingly.

As indicated in FIG. 3, the output from the AFT module 73 may be either analog or binary, and if analog, the signal is indicative of the amount of frequency offset from the intended nominal local oscillator frequency of the voltage controlled oscillator 66, and is imposed on the analog to digital convertor whose digital output is the imposed on the microprocessor 82 for handling by the look-up table 85 and dynamic update module 87 as necessary.

Where the output from the video (AFT) module 73 is binary, that signal is merely indicative as to whether the frequency offset of the output frequency from the volgtage controlled oscillator from the intended nominal local oscillator frequency is higher or lower than that nominal frequency. In any event, the look-up table 85 and dynamic update module 87 will operate accordingly, as to whether the frequency offset is either plus or minus, so that the look-up table 85 is again continuously updated due to any drifting that may occur because of changing temperature or other conditions.

There has been described above methods and apparatus for scrambling and unscrambling a plurality of data streams, where a data package containing at least an identifier code for each data stream, and a routing code by which the plurality of data streams is routed at any instant of time, is encrypted in the data stream. Indeed, the encryption key may also be encrypted, and may be an active key by which the presently transmitted data streams are decrypted, or may be a future key by which the data streams may be decrypted following the next change of an encryption key code.

Several embodiments of circuits have been shown, whereby the output frequency of a voltage controlled oscillator may be accurately determined without overshoot and hunting, so that switching from one assigned data channel to another may be effected without loss of synchronization or data.

Other embodiments of operating circuits, and other codes and keys, and the encryption thereof, may be utilized apart from those which have been expressly discussed above, without departing from the spirit and scope of the appended claims.

What is claimed is:

1. A method of scrambling and unscrambling a plurality of data streams having differing data on a plurality of signal channels, where each data stream has discrete and recognizable synchronizing information contained therein, which is periodically or aperiodically transmitted, and where there are at least as many signal channels, each having a fixed carrier frequency, as there are differing data streams to be scrambled and unscramble; comprising the steps of:

(a) synchronizing all of said plurality of data streams;
    (b) generating an encryption key code and imposing said encryption key code onto said plurality of data streams;
    (c) generating a data package which contains an identifier code for each data stream and a routing code by which said plurality of data streams are routed at any instant of time, so that each said data stream is assigned at that instant of time to a specific one of said plurality of signal channels;
    (d) encrypting said data package in each of said data streams by inserting the same in said data stream at a specific place therein relative to said synchronizing information;
    (e) transmitting said assigned routed data streams on their respective assigned signal channels;
    (f) receiving said assigned routed data streams at any receiver equipped to receive and de-modulate the same;
    (g) at any authorized receiver, capturing said encryption key code and utilizing said encryption key code to decrypt said encrypted data package so as to decode said identifier codes and said routing code; and
    (h) utilizing said identifier codes and said routing codes so as to track a given data stream, no matter on which transmitted channel it appears at any instant of time.

2. The method of claim 1, where each of said data streams has a plurality of identifiable data stream categories which may or may not be mutually exclusive in any combination; where access is permissible to any designated data stream category or combination of catagories by an access data key; and where said encrypted data package includes, periodically or aperiodically, coded data stream category access data relevant to the category of the respective data stream being transmitted.

3. The method of claim 2, where at least one of said data streams has one video signal and other data.

4. The method of claim 3, where said other data may comprise mono or stereo audio signal data, conferencing data by which at least two remote locations are joined together for a multi-path exchange of data, or proprietary data to which limited access is desirable.

5. The method of claim 2, where all authorized receivers have a microprocessor having memory, and where a common encryption algorithm is written into all of said microprocessors' memories.

6. The method of claim 5, where each authorized receiver has a unique address.

7. The method of claim 5 or 6, where at least one of said data streams has one video signal to which a data stream category is assigned and where said data package for said data stream includes a data category code;
    and where each receiver which is authorized to receive the category-identified data stream and has a preset access data key which recognizes and decodes the data stream category code for said category-identified data stream.

8. The method of claim 5 or 6, where at least one of said data streams has one video signal to which a data stream category is assigned and where said data package for said data stream includes a data category code;
    and where each receiver which is authorized to receive the category-identified data stream has a preset access data key which recognizes and decodes the data stream category code for said category-identified data stream; and where the category of a data stream being transmitted may, from time to time, be altered.

9. The method of claim 1, where said transmission of said assigned routed data streams on said signal channels is by way of direct broadcast satellite.

10. The method of claim 1, where said transmission of said assigned routed data streams on said signal channels is by way of terrestrial transmission or distribution techniques chosen from the group comprising co-axial cable distribution, fibre optics distribution, microwave distribution or transmission, VHF/UHF antenna transmission, or any combination thereof.

11. The method of claim 1, where said encrypted data packages are transmitted together with the synchronizing information for all of said synchronized data streams.

12. The method of claim 3, where said encrypted data package is transmitted on at least one vertical interval line of a single frame of said video signal.

13. The method of claim 1, where said encrypted data packages are transmitted within said synchronized data streams.

14. The method of claim 3, where said encrypted data package is inserted within at least some of the horizontal sync intervals of a frame of said video signal.

15. The method of claim 3, where said encrypted data package is carried on a sub-carrier transmitted together with said at least one data stream.

16. The method of claim 6, where said data packages are passed to said microprocessor at each unique receiver address.

17. The method of claim 16, where said receiver is, at any moment, set to track a given data stream; and said data packages are fed to a signal processor which is adapted to strip said identifier and routing codes therefrom, and said identifier and routing codes are then passed, together with a synchronizing signal, to said microprocessor; and said microprocessor controls the tracking of said given data stream by acting upon said identifier and routing codes so as to set said receiver to receive and de-modulate said given data stream at any one of said signal channels as said data stream signal is switched among said signal channels under control of said routing code.

18. Apparatus for scrambling a plurality of data streams having differing data on a plurality of signal channels, where each data stream has discrete and recognizable synchronizing information contained therein which is periodically or aperiodically transmitted, and where there are at least as many signal channels, each having a fixed carrier frequency, as there are differing data streams to be scrambled comprising:

means for generating data stream identifier codes, one for each data stream;
means for generating a signal for synchronizing all of said data streams;
means for selecting any of said data streams for transmission on any one of said signal channels;
means for generating a routing code;
means for generation an encryption key code and inserting the same in said data streams;
means for generating data packages by combining said synchronizing signal, said data stream identifier codes, said routing code, and any other data intended for encryption in each of said data streams;
means for encrypting said data packages in said data streams;
and means for transmitting said data streams with said encrypted data packages;
whereby said data streams are transmitted, at any instant of time, on their respective assigned signal channels according to said routing code and in a specific place relative to said synchronizing signal.

19. The apparatus of claim 18, where said encryption key code is included in said data packages.

20. The apparatus of claim 18, further including means for generating data stream category identifier codes, and for selectively imposing any specific data stream category code on any of said data streams; and where said data stream category identifier codes are included in said data packages.

21. Apparatus for unscrambling a plurality of data streams having differing data, from a plurality of signal channels, where each data stream has discrete and recognizable synchronizing information which is periodically or aperidocially contained therein; where said data streams contain an encryption key code, and each data stream has a data package encrypted therein at a specific place relative to said synchronizing information; and where each data package includes data stream identifier codes and a routing code therefor; comprising:

means for receiving said plurality of signal channels, and for selecting one of said data streams to be tracked;
tuning means for tuning to any one of said signal channels;
demodulating means for demodulating said any one of said signal channels;
means for capturing said encryption key code;
means for utilizing said encryption key code to decrypt said encrypted data package from said data stream on said signal channel being tuned and demodulated;
means for capturing said identifier codes and said routing code; and
means for controlling said tuner so that said tuner tracks said selected data stream from one signal channel to another as it is moved under control of said routing code.

22. The apparatus of claim 21, further including a microprocessor for controlling said tuner by decrypting said data stream according to an encryption algorithm contained in said microprocessor and resolved by said encryption key code.

23. The apparatus of claim 22, where said apparatus has a unique address which is written in a non-volatile random access memory of said microprocessor, and where said data packages periodically or aperiodically include an address code indicative of said address; and including address code recognition means for recognizing the address code indicative of said unique address and upon such recognition enabling said microprocessor to store said data packages and to act upon them.

24. The apparatus of claim 23, where access to a selected data stream may be determined by the presence or absence in the data package for that selected data stream of an access data key code indicative of permitted access to that data stream; and including an access data key enabler which permits said apparatus to track said selected data stream when enabled.

25. The apparatus of claim 24, where said access data key enabler may be preset by an access data key code included in a data package which may be received from time to time, and where said access data key code may set said access data key enabler to enable or disable the tracking of a selected data stream.

26. The apparatus of claim 22, 23 or 24, where any of said data streams may include a data stream category identifier code, and where said access data key enabler may be preset so as to enable or disable said microprocessor to control said tuner with respect to any selected data stream having a specific category identifier code as determined by said access data key code.

27. The apparatus of claim 22, 23 or 24, where said means for utilizing said encryption key code uses the presently transmitted encryption key code so as to permit decryption of the data streams being transmitted at that instant of time.

28. The apparatus of claim 22, 23 or 24, further comprising means for storing the presently transmitted encryption key code, and means for recognizing when said encryption key code is changed; so that said means for utilizing said encryption key code is set for decrypting said data streams at the time that a change of encryption key code occurs, whereby decryption of said data streams is in accordance with the previously transmitted encryption key code.

* * * * *